United States Patent [19]

Carmean et al.

[11] Patent Number: 5,669,003
[45] Date of Patent: *Sep. 16, 1997

[54] METHOD OF MONITORING SYSTEM BUS TRAFFIC BY A CPU OPERATING WITH REDUCED POWER

[75] Inventors: Douglas M. Carmean, Beaverton, Oreg.; John Crawford, Santa Clara, Calif.

[73] Assignee: Intel Corporation, Santa Clara, Calif.

[*] Notice: The term of this patent shall not extend beyond the expiration date of Pat. No. 5,530,932.

[21] Appl. No.: 363,744

[22] Filed: Dec. 23, 1994

[51] Int. Cl.[6] .................................................. G06F 1/32
[52] U.S. Cl. ........................ 395/750.04; 395/750.01; 711/135; 711/141; 711/142; 711/143; 711/146
[58] Field of Search ................................ 395/750, 468, 395/469, 473, 462, 470, 200.08, 200.02, 800

[56] References Cited

U.S. PATENT DOCUMENTS

| | | | |
|---|---|---|---|
| 5,083,266 | 1/1992 | Watanabe | 395/750 |
| 5,297,269 | 3/1994 | Donaldson et al. | 395/425 |
| 5,301,298 | 4/1994 | Kagan et al. | 395/425 |
| 5,303,362 | 4/1994 | Butts, Jr. et al. | 395/468 |
| 5,375,220 | 12/1994 | Ishikawa | 395/425 |
| 5,392,437 | 2/1995 | Matter et al. | 395/750 |
| 5,471,621 | 11/1995 | Ohtsuki | 395/750 |
| 5,481,731 | 1/1996 | Conary et al. | 395/750 |
| 5,490,253 | 2/1996 | Laha et al. | 395/304 |
| 5,522,058 | 5/1996 | Iwasa et al. | 395/472 |
| 5,524,233 | 6/1996 | Milburn et al. | 395/468 |
| 5,530,932 | 6/1996 | Carmean et al. | 395/750 |

Primary Examiner—Jack B. Harvey
Assistant Examiner—Raymond N. Phan
Attorney, Agent, or Firm—Blakely, Sokoloff, Taylor & Zafman

[57] ABSTRACT

A method for maintaining cache coherency while minimizing the power consumption. The method includes operating a first processor in a reduced power mode. While the first processor is operating in a reduced power mode, certain portions of the internal logic in the first processor remain clocked so that the first processor continues to monitor transactions on the system bus. The second processor runs a transaction on the system bus to request data. In the event that the first processor determines that the transaction by the second processor is requesting cache data that is stored in the first processor in a modified state, the first processor signals the second processor. After the current bus cycle is completed, the first processor writes back the modified cache line on the system bus and second processor re-runs the transaction on the system bus.

24 Claims, 5 Drawing Sheets

| 31 | 8 | 7 | 6 | 5 | 4 | 3 | 2 | 1 | 0 |
|---|---|---|---|---|---|---|---|---|---|
| 0 (RESERVED) | FE | SME | AHD | DPD | APD | CI | SE | TR | NBP |

METHOD OF MONITORING SYSTEM BUS TRAFFIC BY A CPU OPERATING WITH REDUCED POWER

FIELD OF THE INVENTION

The present invention relates generally to the field of microprocessor-based computer systems; more particularly, to multiprocessor computer systems which include features for regulating power consumption.

BACKGROUND OF THE INVENTION

Advances in semiconductor processing technology have made it possible to compact the feature sizes of integrated circuits to allow more transistors to be fabricated on a single semiconductor substrate. For example, the most sophisticated microprocessors being manufactured today typically comprise a single integrated circuit (IC) made up of several million transistors. Although these astounding technological advances have made it possible to dramatically increase the performance and data handling capabilities of today's modern computer systems, these advances have come at the cost of increased power consumption. Increased power consumption, of course, means that there is more heat that must be dissipated from the IC.

Because excessive power consumption and heat dissipation is now a critical problem facing computer designers, various power-saving techniques have evolved for minimizing power supply current levels within computer systems. Many of these techniques adopt the strategy of powering down the microprocessor when not in use to conserve power. This approach, however, is not without drawbacks.

By way of example, a problem arises in multiprocessor (MP) computer systems which employ two or more processors that cooperate to complete system tasks. If one microprocessor has been powered-down (e.g., because its current tasks have been completed or it is otherwise inactive) another microprocessor in the system may continue to perform data transactions on the system bus. The problem is that some the bus transactions may attempt to read/write data stored in a modified state in a powered-down or otherwise inactive microprocessor. Unless there exists some mechanism for monitoring bus activity and updating shared memory locations, data coherency will be lost. Therefore, MP computer systems have a need for a mechanism which makes inactive processors both aware and responsive to bus activity that may attempt to access stale data.

As will be seen, the present invention provides a method for monitoring bus traffic in a computer system during halt of a central processing unit (CPU). In accordance with the present invention, an inactive or powered-down processor responds to certain bus transactions by writing back modified data to the system bus while maintaining a reduced power mode of operation. In addition, the invention functions without latency or intervention from the operating system. Thus, the invention provides a totally transparent way of interacting with an external bus while minimizing power consumption.

SUMMARY OF THE INVENTION

A method of managing a multiprocessing computer system to maintain cache coherency and minimize power consumption is covered. The method of the present invention comprises the steps of operating a first processor in a reduced power mode. Next, a second processor runs a transaction on a system bus to request data. Even though the first processor is in a reduced power mode of operation, certain portions of internal logic remain clocked so that the first processor can monitor the transaction on the system bus. In the event that the first processor determines that the bus cycle of the second processor is to a cache line stored in the first processor in a modified state, the first processor signals the second processor. After the current bus cycle completes, the first processor writes back the modified cache line on the system bus. The second processor is then able to re-run the transaction on the system bus. One of the key aspects of the invention is that the first processor remains in the reduced power mode of operation throughout the above-described steps.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 5 illustrates a test register which includes bits allowing software to disable certain features in accordance with the present invention.

DETAILED DESCRIPTION

The present invention is a method of operating a multiprocessor computer system to maintain memory coherency while minimizing power consumption. In the following description, numerous specific details are set forth, such as particular signals, protocol, device types, etc., to provide a thorough understanding of the present invention. It should be understood, however, that these specific details need not be used to practice the present invention. In other instances, well known structures, circuit blocks, and architectures have not been shown in detail to avoid unnecessarily obscuring the present invention.

Figure 1:
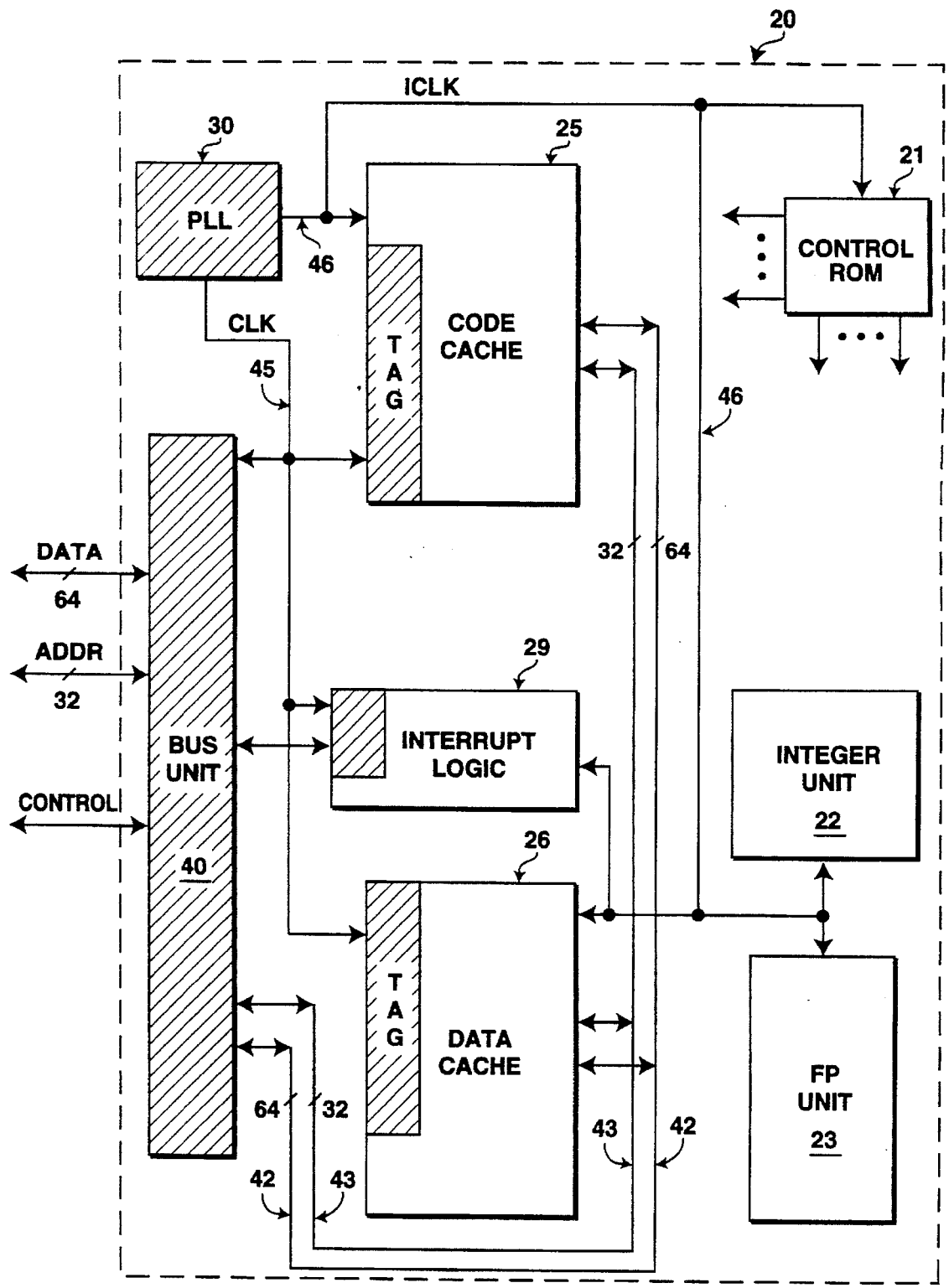
FIG. 1 is a generalized block diagram of a microprocessor operating in accordance with the present invention.

FIG. 1 is a block diagram of a microprocessor 20 which incorporates various features of the present invention. In one embodiment, processor 20 comprises an improvement of the commercially-available Pentium™ processor manufactured by Intel Corporation of Santa Clara, Calif. Although the present invention will be described in conjunction with the embodiment of FIG. 1, it should be understood that the broad concept of the present invention is applicable to many different types of computer systems—covering microprocessors that are compatible with the Pentium™ processor, or which utilize different data processor architectures.

Microprocessor 20 includes a phase-locked loop (PLL) circuit 30 that provides an internal clock signal (ICLK) coupled along line 46 to the various functional unit blocks of the integrated circuit. For example, the ICLK signal present on line 46 is shown in FIG. 1 coupled to a majority of the internal logic of the IC, including instruction or code cache 25, data cache 26, control ROM 21, and the internal logic which comprises the integer unit 22 and floating point (FP) unit 23 of the processor. The ICLK signal is also coupled to a portion of the interrupt logic unit 29. Instruction cache 25, data cache 26 and bus unit 40 are each coupled to a 64-bit data bus 42 and 32-bit address bus 43.

In addition to the ICLK signal, PLL circuit 30 also provides a second clock signal (CLK) that is coupled along line 45 to the tag comparison arrays of instruction or code cache 25 and data cache 26. The CLK signal on line 45 is also coupled to a portion of interrupt logic unit 29 and bus unit 40. (The distinction between the ICLK and CLK clock signals is discussed in more detail below.) During normal operation microprocessor 20 operates with a clock (i.e., ICLK and CLK) frequency of approximately 100 MHz. Variations of processor 20 may also support a variety of core/bus ratios. For instance, in alternative implementations bus frequencies of 50 MHz and 60 MHz are supported.

In one embodiment, bus unit 40 and interrupt logic unit 29 include logic circuitry enabling microprocessor 20 to be utilized in a MP system. By way of example, bus cycles issued and received by bus unit 40, as well as interrupt signals received and provided by interrupt logic unit 29, are compatible with the well-known Pentium™ processor. Microprocessor 20 also includes logic that maintains cache consistency and which arbitrates for an external bus.

In one embodiment, microprocessor 20 also includes power management features which allow the processor to enter a reduced power dissipation state (i.e., a HALT or STANDBY mode of operation). When functioning in a normal mode of operation at peak power, microprocessor 20 may dissipate as much as 10 watts; in a HALT or STANDBY mode of operation, as little as 700 milliwatts of power is consumed. One of the ways in which microprocessor 20 implements power management functions, as well as operating system independent functions, is by a system management mode of operation. System management mode (SMM) consists of an interrupt (SMI), an alternative address space and an instruction (SRET). The system management interrupt causes a system management interrupt request to be latched within logic unit 29. When the latch SMI# is recognized on an instruction boundary, microprocessor 20 enters SMM.

With continuing reference to FIG. 1, in one implementation microprocessor 20 includes an external pin (labeled STPCLK#) and associated circuitry that can be used to regulate the power of the microprocessor. The STPCLK# pin is disclosed more fully in co-pending application entitled, "Method And Apparatus For Asynchronously Stopping The Clock In A Processor", Ser. No. 07/970,576, filed Nov. 3, 1992, herein incorporated by reference, which application is assigned to the assignee of the present invention. The STPCLK# pin provides a level-sensitive SMI that places the processor in a low-power STANDBY state. In accordance with the present invention, microprocessor 20 responds to both private (i.e., ADS#) and external snoop (i.e., EADS#) requests while in a STANDBY mode of operation.

Processor 20 also supports a mechanism referred to as AUTO_HALT that places the processor in a reduced power mode of operation every time a HALT instruction is executed. Microprocessor 20 responds to all stop break events including private snoops and inter-processor interrupt events that are generated while the processor is in a reduced power state (without the STPCLK# pin asserted).

When microprocessor 20 functions in a normal mode of operation both clock lines 46 (ICLK) and 45 (CLK) are enabled such that the internal core clock signal is provided to all units of the integrated circuit. When the processor enters a low-power or STANDBY state as a result of the assertion of either the STPCLK# pin or the execution of a HALT instruction, the internal clock signal (ICLK) on line 46 is disabled. It should be understood, however, that disabling line 46 does not alter the continuous functioning of PLL circuit 30. In other words, PLL 30 continues to generate an internal core CLK frequency on line 45 coupled to certain portions of microprocessor 20. The portions of microprocessor 20 which remain operational (i.e., activated by CLK) include PLL 30, the tag comparison arrays of cache units 25 and 26, a portion of interrupt logic unit 29 and bus unit 40. In accordance with the present invention, providing power to the selected portions of microprocessor 20 allows the processor to monitor and respond to external bus traffic for the purpose of maintaining cache coherency in MP systems. That is, bus arbitration and cache coherency mechanisms are intentionally kept active in a reduced power mode of operation.

Figure 2:
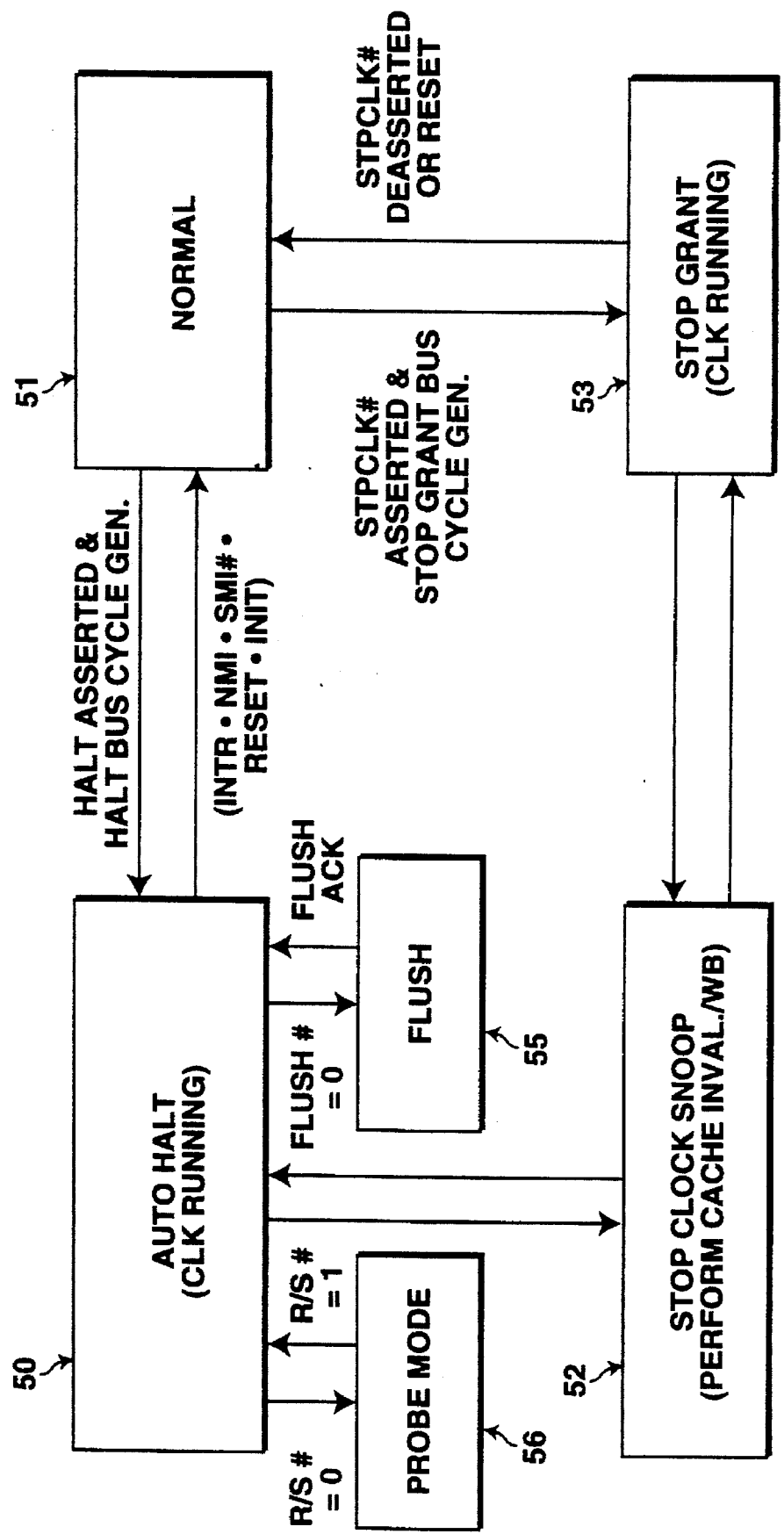
FIG. 2 is a diagram showing state transitions for the clock control architecture utilized in one embodiment of the present invention.

Referring now to FIG. 2, there is shown a state diagram illustrating certain key features of one embodiment of the present invention. In normal operating conditions, state 51, microprocessor 20 is active executing instructions. This represents the processor's full power state in which both the ICLK and CLK signals are coupled to all portions of the IC's internal logic.

The STOP_GRANT state, represented by block 53, can be entered by asserting the external STPCLK# pin of microprocessor 20. In the STOP_GRANT state the integrated circuit operates in a reduced power consumption mode wherein most of the internal functional units of the processor are deactivated (i.e., ICLK off). On the other hand, bus unit 40, the tag arrays of caches 25 and 26, PLL 30 and portions of the interrupt logic unit 29 remain active. Once the STOP_GRANT bus cycle has been placed on the bus and the BRDY# signal is returned, the processor is in the STOP_GRANT state. Practitioners in the art understand the BRDY# signal to indicate that the external system has presented valid data on the data pins in response to a read, or that the external system (e.g., main memory, other processor, etc.) has accepted the processor data in response to a write request. In one embodiment, the processor returns to the normal execution state approximately ten clock periods after STPCLK# has been deasserted. A RESET also brings the processor out of the STOP_GRANT state, returning it to the normal state.

Processor 20 recognizes inputs to bus unit 40 for maintaining cache coherency (e.g., invalidation's and external snoops) by monitoring bus traffic when in a reduced power mode of operation. For example, while in the STOP_GRANT state, the processor latches transitions on external interrupt signals (e.g., SMI#, NMI, INTR, FLUSH#, R/S# and INIT). All of these interrupts are taken after the de-assertion of STPCLK#; that is, upon re-entering the normal state.

The AUTO_HALT state, denoted by block 50 in FIG. 2, is entered whenever the HALT instruction is executed. In AUTO_HALT state the internal clock (ICLK) is decoupled from a majority of the internal logic while the continuous clock signal CLK keeps selected functional units of the chip operational. Upon the occurrence of the INTR, NMI, SMI#, RESET or INIT, the processor transitions back to the normal operating state, i.e., state 51. As explained earlier, the AUTO_HALT state results in a significant reduction in power consumption by stopping the clock signal to most of the internal logic of the processor. The bus unit 40, PLL 30, tag arrays, and interrupt logic remains active to support snoops and to allow fast restart. Any external interrupt causes the processor to exit AUTO_HALT state 50 and return to normal operating state 51.

When operating in AUTO_HALT state 50, the assertion of a FLUSH# signal (active low) causes the flush event to be latched and acted upon as illustrated by block 55. For the embodiment described, the FLUSH# signal forces the processor to write-back all modified lines in data cache 26 and invalidate its internal caches. A FLUSH acknowledge special signal is then generated by the processor indicating completion of the write-back and invalidation operations.

Assertion of the R/S# input (active low) causes the processor to stop normal execution and place it in an IDLE state. FIG. 2 illustrates a R/S# event causing a transition from AUTO_HALT state 50 to enter PROBE_MODE state 56. The R/S# pin is provided for use with debugging of the processor in conjunction with a special debug port. A high-to-low transition of the R/S# pin interrupts the processor and causes it to stop execution at the next instruction boundary. De-assertion of the R/S# pin causes a transition from PROBE_MODE state 56 back to AUTO_HALT state 50.

FIG. 2 also includes state 52 which represents the snooping ability of the processor when operating in a reduced power mode, as would be the case following the assertion of the STPCLK# pin or the execution of a HALT instruction. Even though power dissipation is reduced in either of these two states, the processor continues to drive bus signals via unit 40, and the processor's internal machine state is preserved. Both private and inter-processor snoops are supported for both cache invalidation and write-back cycles. Power consumption increases for a short period if the snoop requires a write-back cycle to be run. In accordance with the present invention snoops are handled completely by hardware without the need for microcode intervention.

In both the STOP_GRANT and AUTO_HALT states, microprocessor 20 supports snoops—including private and inter-processor snoops—by keeping the cache units tag comparison logic enabled by CLK. This is illustrated in FIG. 1, wherein the CLK signal on line 45 is coupled to the tag comparison logic of caches 25 and 26. On the other hand, the ICLK signal is disabled to the data array portions of the caches to minimize power consumption. When a snoop occurs, the MESI (i.e., Modified, Exclusive, Shared, Invalid) cache protocol bits are updated when the need arises. Portions of the processor (e.g., at least the data cache, associated cache control logic, and buses between the data cache and bus interface) other than the tag arrays are awakened only if a write-back cycle is required. In an alternative embodiment, more aggressive power saving may be achieved by disabling the tag comparison logic in certain situations, e.g., all the cache entries are invalid, or to power down the tag arrays until a snoopable transaction has been detected then provide a slightly increased power state to allow the tags to perform the snoop operation.

Note that FIGS. 1–4 illustrate only one examplary embodiment of the present invention; however, more complex implementations are possible to provide a variety of power saving techniques involving a variety of different clocking schemes. The same is true with respect to the particular protocol employed once snooping has been performed. For instance, instead of having the first processor write back the data on the system bus, the first processor might absorb the write and keep the dirty line. Thus, practitioners in the art will appreciate the many different ways that the present invention may be implemented.

Figure 3:
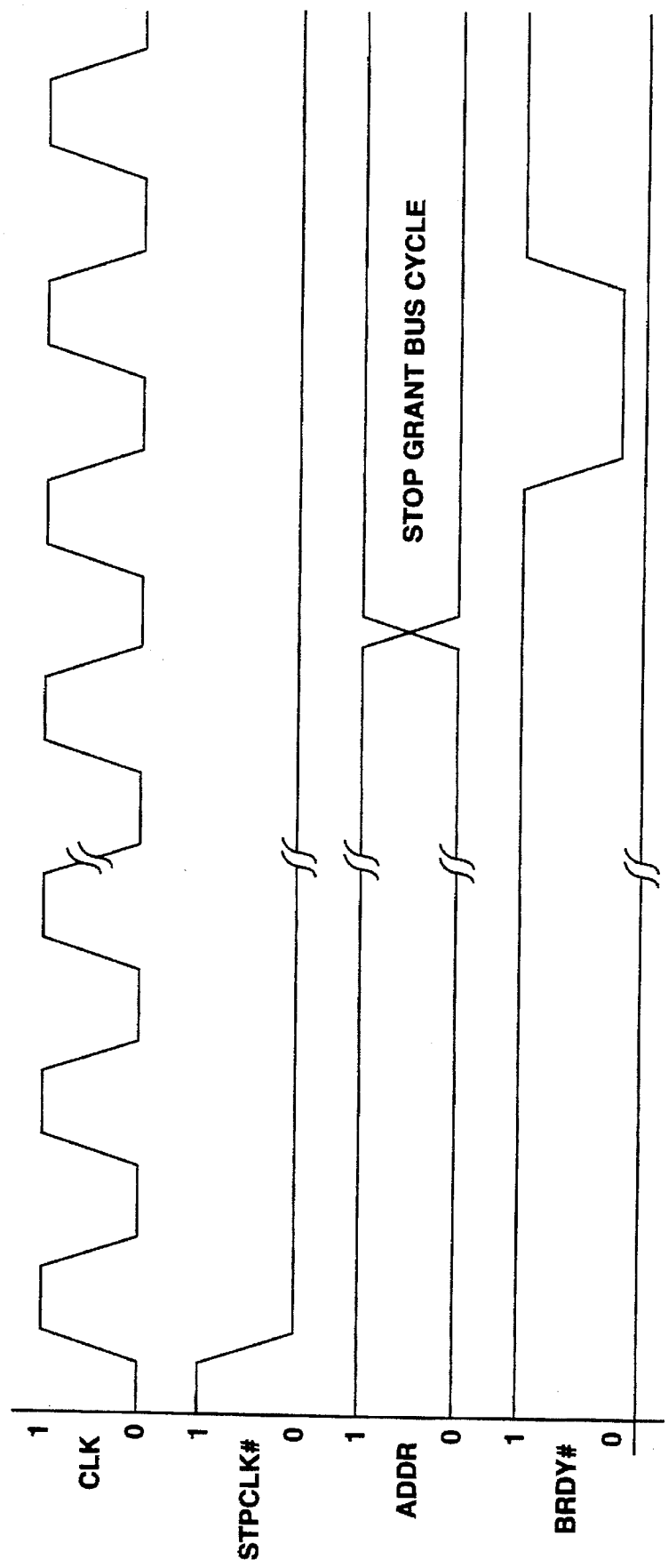
FIG. 3 is a timing diagram illustrating the operation of one aspect of the present invention.

FIG. 3 illustrates a timing diagram showing the latency between a STPCLK# request and the STOP_GRANT bus cycle. Note that for the illustrative embodiment, there is a delay of approximately ten clocks between the STPCLK# request and the STOP_GRANT bus cycle. This latency is dependent upon the current instruction, the amount of data in the CPU write buffers, and system memory performance.

Data cache 26 of processor 20 utilizes the MESI protocol to enforce cache consistency. A line in the data cache can be in the Modified, Exclusive, Shared or Invalid state, whereas a line in instruction cache 25 can be either in the Valid or Invalid state. The present invention is directed to situations which can arise wherein two or more processors share common data in a computer system. The local caches of the processors may attempt to cache data whenever possible. In one embodiment of processor 20, a private cache coherency mechanism is included to guarantee data consistency between processors. If any data is cached in one of the processors and another processor attempts to access the data, the processor containing the data notifies the requesting processor that it has cached the data. The state of the cache line and the processor containing the data will change depending upon the current state, and the type of request that the other processor has made.

In accordance with the present invention, the basic coherency mechanism requires that the processor not running a cycle and which does not own a bus (herein referred to as the least-recent bus master, or LRM) snoop all MRM bus activity (MRM referring to the most-recent bus master that owns the bus). The MRM processor running a bus cycle then watches the LRM processor for an indication that the data is contained in the LRM cache.

To better appreciate the operation of the present invention, consider the example arbitration interface exchange represented in FIGS. 4A–4D. First, assume that processor $P_B$ is operating in a reduced power mode or is idle on external bus 60. This would be the case if processor $P_B$ were in the AUTO_HALT or STOP_GRANT states. Also assume that processor $P_A$ in the computer system just ran a write cycle on external bus 60. Furthermore, assume that the write cycle on the bus is to a line that is in the modified (M) state in processor $P_B$. This is the situation depicted in FIG. 4A. Because both the bus unit and the internal interrupt and snoop logic remains active in processor $P_B$—despite the fact that most of the other internal logic is powered down—processor $P_B$ automatically snoops external bus 60 to monitor the write cycle started by processor $P_A$.

Figure 4A:
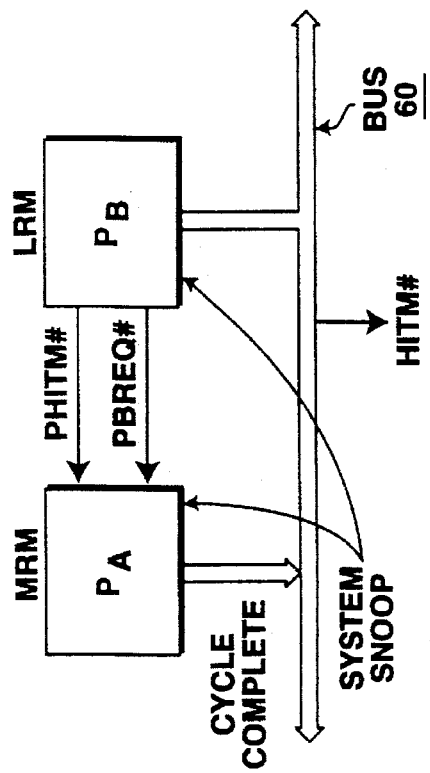
FIGS. 4A–4D are a set of diagrams illustrating various exemplary operations performed in one embodiment of the present invention.
Figure 4B:
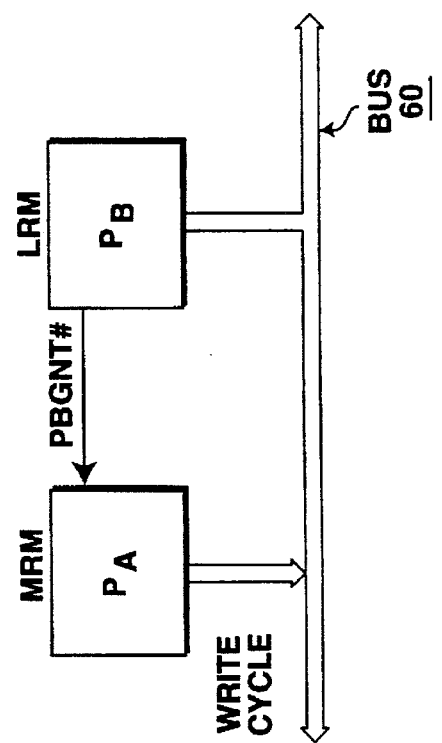

FIG. 4B shows processor $P_B$ indicating to processor $P_A$ that the write transaction has hit a Modified state cache line. This is done by asserting the PHITM# signal coupled to processor $P_A$. Processor $P_B$ also asserts a private arbitration pin, PBREQ#, to indicate that processor $P_B$ has generated a bus request (in this example, it is assumed that processor $P_A$ currently owns external bus 60). Note that a HITM# signal is also coupled to bus 60 to inhibit another bus master from accessing the data until after the line has been completely written back. Processor $P_A$ then completes the write cycle on external bus 60 as if processor $P_B$ did not exist.

The external snoop happens just as the write cycle completes on bus 60, but before processor $P_B$ has had a chance to write the modified data back to system memory. FIG. 4B illustrates processor $P_B$ asserting the HITM# signal to inform the system that the snoop address is cached in the dual processor pair and is in a Modified state. The external snoop in this example hits the same line that caused the PHITM# signal to be asserted.

Figure 4C:
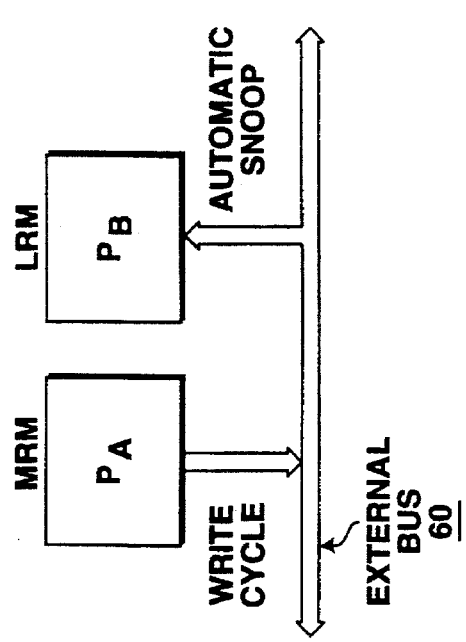

In FIG. 4C, an arbitration exchange has occurred on external bus 60 and processor $P_B$ now owns the bus. At this point, processor $P_B$ writes back the M state line. From the viewpoint of the computer system, it appears as if a single processor was completing the snoop transaction. Note that in FIG. 4C, two private arbitration pins coupled between the two processors are utilized to indicate that bus ownership has been granted to processor $P_B$ (or that processor $P_A$ requests ownership back after completion of the writeback operation).

Figure 4D:
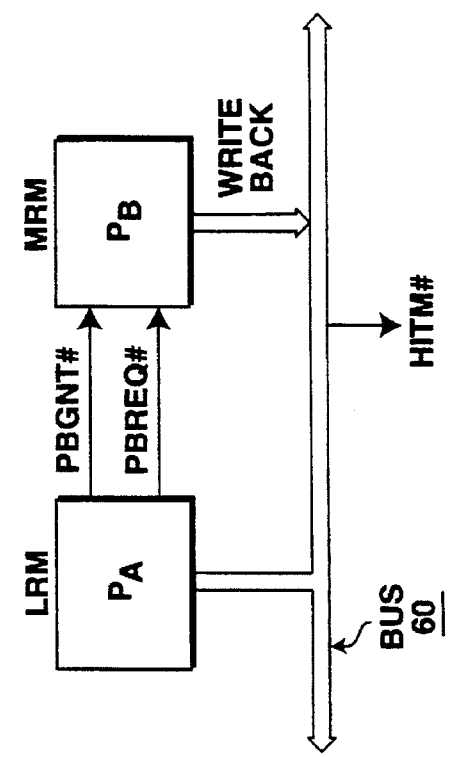

Finally, in FIG. 4D processor $P_A$ reruns the original write cycle after processor $P_B$ has granted the bus back to processor $P_A$. It is important to recognize that processor $P_B$ has remained in a reduced power consumption mode of operation throughout the entire snoop and writeback processes represented by FIGS. 4A–4D. This is a key feature of the present invention since it provides a considerable advantage in computer systems limited by power consumption requirements, but yet having a need for cache coherency.

With reference now to FIG. 5, there is shown a specialized test register 12 which includes bits to allow software to disable certain features of microprocessor 20. For example, the AUTO_HALT feature may be disabled to setting bit 6 in register 12 to a "1". In this setting, the execution of a HALT instruction does not disable the internal clock (ICLK) to any of the functional units of the processor. In one embodiment, the AUTO_HALT feature is enabled by default, i.e., bit 6 in register 12 is set to a "0" after RESET.

Other features which are controlled by software via test register 12 include advanced programmable interrupt controlling (APIC) for multiprocessor systems. In one embodiment of the present invention the processor incorporates an advanced processor SMI controller that supports interrupts in a complex, multiprocessor environment, as well as interrupts in a simple uniprocessor environment. The local interrupt controller module communicates with an I/O APIC module (such as part no. 8259A manufactured by Intel Corporation) over a 3-wire serial bus. When bit 4 of register 12 is set to a "1", the APIC feature is completely disabled. This means that the APIC circuitry cannot send or receive any interprocessor interrupts. Reads or writes to the APIC register space are sent through to the external bus.

Dual processor arbitration hardware may also be disabled when bit 5 of register 12 is set. When this bit is set to a "1", the private dual processor features (e.g., PHIT#, PHITM#, PBREQ#, and PBGRNT# pins) are disabled as soon as the processor becomes the most recent bus master (MRM). If this bit is subsequently set to "0", then the DP features are re-enabled. Other features, which may be enabled/disabled by register 12, include SMM entry and exit messages (bit 7), and fast execution tracing messages (bit 8).

What is claimed is:

1. In a computing system which includes first and second microprocessors coupled to a system bus, a management method comprising the steps of:

(a) operating the first microprocessor in a reduced power mode;

(b) running a transaction that requests a data transfer on the system bus by the second microprocessor that requests a data transfer;

(c) monitoring the transaction on the system bus by the first microprocessor while operating in the reduced power mode;

(d) indicating to the second microprocessor that the data requested is stored in the first microprocessor while operating in the reduced power mode.

2. The method of claim 1 further comprising the steps of:

(e) writing back the data requested on the system bus by the first microprocessor while operating in the reduced power mode; and (f) re-running the transaction on the system bus by the second microprocessor.

3. The method of claim 2 wherein the first microprocessor operates in the reduced power mode throughout steps (a)–(d) and temporarily increases its power consumption level during step (e) before performing step (f) in the reduced power mode.

4. The method of claim 2 wherein the data requested is stored in a modified state in the first microprocessor prior to step (e).

5. The method of claim 4 further comprising prior to step (e), the steps of:

(g) requesting bus ownership from the second microprocessor while the first microprocessor is operating in the reduced power mode; and (h) granting bus ownership to the first microprocessor while operating in the reduced power mode.

6. The method of claim 5 further comprising the steps of:

(i) granting bus ownership to the second microprocessor while the first microprocessor is operating in the reduced power mode after step (h); and (j) completing the transaction on the system bus.

7. The method of claims 1, 2, 3, 4 or 5 further comprising, the step of:

(i) completing the transaction on the system bus.

8. In a data processing system including first and second microprocessors each having internal logic that includes a data cache and a bus unit coupled to a system bus, a method of system operation to maintain cache coherency comprising the steps of:

(a) reducing the power consumption of the first microprocessor by decoupling a clock signal to a majority of the internal logic of the first microprocessor, but still coupling the clock signal to the bus interface of the first microprocessor;

(b) starting a write cycle on the system bus by the second microprocessor to request a cache line of data;

(c) snooping the write cycle on the system bus by the bus interface of the first microprocessor while reducing the power consumption of the first microprocessor; and (d) signaling to the second microprocessor by the first microprocessor that a modified cache line of the data is stored in the data cache of the first microprocessor while reducing the power consumption of the first microprocessor.

9. The method according to claim 8 further comprising the step of:

(e) completing the write cycle on the system bus by the second microprocessor.

10. The method according to claim 8 wherein step (a) further comprises the step of:

executing an instruction which halts the first microprocessor.

11. The method according to claim 9 further comprising the step of:

(f) writing back by the first microprocessor the modified cache line of data on the system bus while reducing the power consumption of the first microprocessor; and (g) re-running the write cycle on the system bus by the second microprocessor.

12. The method according to claim 11 further comprising the step (c), of:

checking a tag array of the data cache of the first microprocessor to determine whether the cache line requested by the second microprocessor is stored in the data cache of the first microprocessor.

13. The method according to claim 11 further comprising the step, prior to step (f), of:

arbitrating for ownership of the data processing system by the first microprocessor while reducing the power consumption of the first microprocessor.

14. The method according to claim 13 further comprising the step, prior to step (g), of:

granting ownership of the system bus to the second microprocessor while reducing the power consumption of the first microprocessor.

15. The method according to claim 11 wherein the clock signal remains decoupled to the majority of internal logic of the first microprocessor during steps (a)–(g), except that power consumption of the first microprocessor is temporarily increased during step (f).

16. The method according to claim 8 wherein step (a) further comprises the step of:

applying a voltage signal to an external pin of the first microprocessor that regulates the power consumption of the first microprocessor.

17. The method according to claims 8, 9, 11, 12, 13, 14, 17, 18 or 19 further comprising the step of:

returning the first microprocessor to a normal power consumption mode of operation.

18. The method according to claim 17 wherein the returning step comprises the step of generating an interrupt or reset signal coupled to the first microprocessor.

19. In a computing system which includes first and second microprocessors coupled to a system bus, a management method comprising the steps of:

(a) operating the first microprocessor in a reduced power mode in which a majority of an internal logic of the first microprocessor is decoupled from a clock signal, but still providing the clock signal to at least a bus interface of the first microprocessor;

(b) running a transaction on the system bus by the second microprocessor which requests data;

(c) monitoring the system bus by the bus interface of the first microprocessor while in the reduced power mode for the transaction.

20. The method of claim 19 further comprising the steps of:

(d) detecting the transaction on the system bus by the bus interface of the first microprocessor while operating in the reduced power mode;

(e) snooping the transaction on the system bus by the bus interface of the first microprocessor while operating in the reduced power mode; and (f) signaling to the second microprocessor by the first microprocessor while operating in the reduced power mode that the data requested is in a modified state in a data cache of the first microprocessor.

21. The method according to claim 20 further comprising the step of:

completing the transaction of the system bus by the second microprocessor.

22. The method according to claim 20 further comprising the step of:

(g) writing back by the first microprocessor while operating in the reduced power mode the data in the modified state in the data cache of the first microprocessor on the system bus; and (h) re-running the transaction on the system bus by the second microprocessor.

23. The method of claim 20 further comprising the step, prior to step (e), of:

providing the clock signal to a tag array associated with the data cache of the first microprocessor.

24. The method of claim 22 wherein power consumption is temporarily increased in the first microprocessor during step (g).

* * * * *